United States Patent [19] [11] 3,929,690
Wright [45] Dec. 30, 1975

[54] PHOTODEGRADABLE STYRENE POLYMER FOAMS CONTAINING CONJUGATED KETO STEROIDS

[75] Inventor: Harold A. Wright, Murrysville, Pa.

[73] Assignee: ARCO Polymers, Inc., Philadelphia, Pa.

[22] Filed: Nov. 29, 1974

[21] Appl. No.: 528,063

[52] U.S. Cl. .................. 260/2.5 HB; 260/DIG. 43
[51] Int. Cl.² .......................................... C08J 9/20
[58] Field of Search .............. 260/DIG. 43, 2.5 HB; 424/238, 243

[56] References Cited
UNITED STATES PATENTS

| | | | |
|---|---|---|---|
| 3,431,189 | 3/1969 | Offenhauer et al. | 204/159.18 |
| 3,798,187 | 3/1974 | Miyoshi et al. | 260/2.5 HB |
| 3,832,312 | 8/1974 | Wright | 260/DIG. 43 |

FOREIGN PATENTS OR APPLICATIONS

| | | |
|---|---|---|
| 1,252,336 | 11/1971 | United Kingdom |

*Primary Examiner*—Eugene C. Rzucidlo
*Attorney, Agent, or Firm*—Lewis J. Young

[57] ABSTRACT

Expandable styrene polymer particles which are photodegradable are produced by suspending styrene polymer particles in an aqueous medium and impregnating a blowing agent into the particles in the presence of 0.5 – 5.0 parts of photosensitizer per 100 parts of polymer particles. The photosensitizer is selected from the steroids having a 3-keto-group combined with an ethylenic unsaturation in either the 1-, 4-, or 1,4-positions.

18 Claims, No Drawings

PHOTODEGRADABLE STYRENE POLYMER FOAMS CONTAINING CONJUGATED KETO STEROIDS

BACKGROUND OF THE INVENTION

This invention relates to a process for making foamed styrene polymers photodegradable by incorporating photosensitizers into the polymer during the impregnation of the polymers with a blowing agent.

The making of low density, cellular, shaped, plastic articles from expandable particles of styrene polymers is well know. Such particles generally contain a blowing agent which boils below the softening point of the polymer and which will cause the particles to expand when they are heated. When the expanded particles are heated in a mold cavity, the particles expand further to fill the mold and fuse together to form a shaped article. Examples of articles made by this process are drinking cups, meat packaging trays, egg cartons, fruit packaging trays and the like.

The articles so produced are generally quite stable to sunlight and weather conditions. It is desirable, however, to provide a method whereby discarded foamed articles will degrade under outdoor weather conditions to help disposal problems and prevent litter accumulation.

Many additives have been developed which accelerate the degradation of plastic articles and much experimentation is being done to develop new systems. The additives are generally added to the polymers by physical mixing, such as blending, or by simultaneous extrusion of the polymer and additive. One such additive is benzophenone, a compound known to be a photosensitizer.

SUMMARY OF THE INVENTION

In accordance with the present invention, photosensitizers selected from the steroids having a 3-keto-group combined with an ethylenic unsaturation conjugated therewith are incorporated into styrene polymer particles during the process of impregnating the particles with a blowing agent. Incorporation of from 0.5 to 5.0 parts of photosensitizer per 100 parts of polymer gives a foamable product which, when foamed, is degradable by sunlight and weather much more rapidly than is the untreated polymer.

DETAILED DESCRIPTION OF THE INVENTION

In accordance with this invention, a variety of expandable thermoplastic homopolymers and copolymers can be rendered degradable. The polymers may be derived from vinyl aromatic monomers including styrene, vinyltoluene, isopropylstyrene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

The styrene polymers can, of course, be produced by any of the known techniques. The preferred method of preparation is the suspension technique, which gives bead or pellet shaped product.

The photosensitizer may be added to the polymer particles after the particles have been completely polymerized (i.e., as a hard bead impregnation). Addition of photosensitizer prior to substantially complete polymerization can result in upsetting the delicate balance needed for the polymerization reaction and would result in interference with the reaction. The addition, in this instance, is to the aqueous suspension in which the particles were prepared and prior to separation of the particles from the aqueous reaction medium. The blowing agent can be added either prior to hard bead formation or simultaneously with the photosensitizer.

Alternatively, particles of styrene polymer may be resuspended in an aqueous medium and impregnated with blowing agent and photosensitizer. In this case, suspending agents are added to the water to keep the particles from agglomerating at the elevated temperatures used during the impregnation process. Suitable suspending agent systems are, for example, those described in D'Alelio, U.S. Pat. No. 2,983,692, such as tricalcium phosphate in combination with an anionic surfactant.

The impregnation is conventionally carried out at temperatures ranging from about 80° to 150°C. Increasing the temperature makes the impregnation proceed at a faster rate.

The blowing agents are compounds which are gases or which will produce gases on heating. Preferred blowing agents include aliphatic hydrocarbons containing from 1–7 carbon atoms in the molecule, such as methane, ethane, propane, butane, pentane, hexane, heptane, cyclohexane, and their halogenated derivatives which boil at a temperature below the softening point of the polymer. Mixtures of these agents may also be used, such as a mixture of 40–60% n-pentane and 60–40% trichlorofluoromethane. Usually from 3 to 20% of blowing agent per 100 parts of polymer is incorporated by the impregnation.

The photosensitizers useful in the present invention are those steroids having a 3-keto-group combined with an ethylenic unsaturation conjugated therewith, i.e., in the 1 or 4 position or both the 1 and 4 positions. Steroids are compounds based on the perhydrocyclopentaphenanthrene ring system shown in structure I.

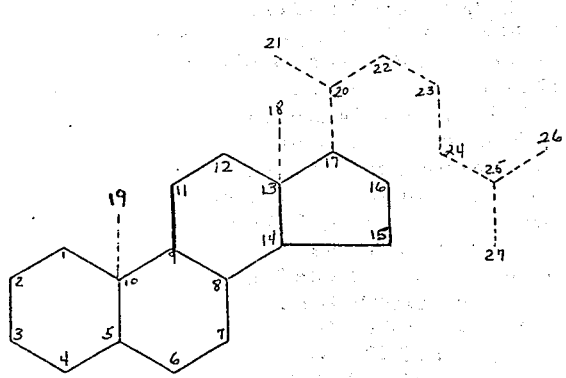

I

The unsubstituted structure I, involving the 1–17 carbon atoms is called gonane. Compounds having a methyl group at the 13-position are called estranes. Compounds having methyl groups at both the 10 and 13-positions are androstanes. Androstanes having an ethyl group at the 17-position are pregnanes. Androstanes having a 2-methylbutyl group at the 17-position are cholanes. Androstanes having a 1,5-dimethylhexyl group at the 17-position are cholestanes.

The compounds especially useful in the invention are those steroids having the structure II, III, or IV.

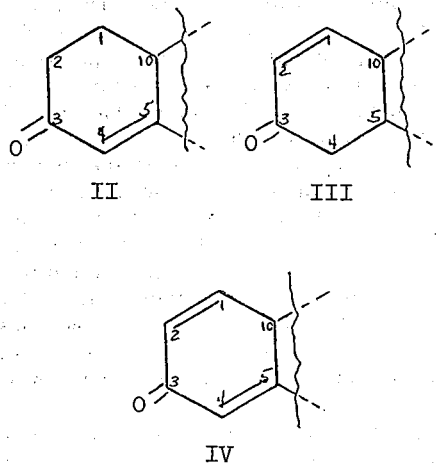

The useful compounds of the invention are therefore gon-1-en-3-one, gon-4-en-3-one, gona-1,4-dien-3-one, estr-1-en-3-one, estr-4-en-3-one, estra-1,4-dien-3-one, androst-1-en-3-one, androst-4-en-3-one, androsta-1,4-dien-3-one, pregn-1-en-3-one, pregn-4-en-3-one, pregna-1,4-dien-3-one, chol-1-en-3-one, chol-4-en-3-one, chola-1,4-dien-3-one, cholest-1-en-3-one, cholest-4-en-3-one, cholesta-1,4-dien-3-one, and their derivatives. The derivatives may contain any of a variety of substituents, such as, alkyl having 1 to 4 carbon atoms, halogen (including fluorine, chlorine and bromine), keto, hydroxy, and acetoxy. It will be noted that most of the steroids herein discussed have both an alpha and a beta configuration of the substituent groups. Both forms are believed to be equally active as photosensitizers.

Additional specific examples of steroids within the class herein claimed, but not intended to limit the class, are the following:

13-ethylgon-4-ene-3,17-dione
13-ethyl-16,17-dihydroxygon-4-en-3-one
13-ethyl-17-hydroxygon-4-en-3-one
17-hydroxyestr-4-en-3-one
17-hydroxyestra-4,14-dien-3-one
17-fluorestra-4,16-dien-3-one
1-hydroxyestr-4-ene-3,17-dione
6,6-difluoroestr-4-ene-3,17-dione
6-hydroxyestr-4-ene-3,17-dione
estr-4-ene-3,6,17-trione
10,16-dihydroxyestr-4-en-3-one
10,17-dihydroxyestr-4-en-3-one
17-hydroxyestr-4-en-3-one
androst-4-ene-3,17-dione
androsta-1,4-diene-3,17-dione
17-hydroxyandrost-4-en-3-one (Testosterone)
17-hydroxyandrosta-1,4-dien-3-one
androsta-4,6-dien-3-one
17-hydroxyandrost-1-en-3-one
androsta-1,4-diene-3,11,17-trione
androst-4-ene-3,11,17-trione
pregn-4-ene-3,20-dione (Progesterone)
pregn-4-ene-3,11,20-trione
pregna-4,16-diene-3,20-dione
cholest-4-ene-3,6-dione
6-hydroxycholest-1-en-3-one
2-bromocholest-4-en-3-one
6-bromocholest-4-en-3-one
6-chlorocholest-4-en-3-one
7,12-dihydroxycholest-4-en-3-one The photosensitizer is added to the suspension of polymer particles at the same time as the blowing agent. Best results are obtained when amounts of photosensitizer between 0.5 and 5.0 parts per 100 parts of polymer are added. Less than 0.5 part of photosensitizer does not give sufficiently accelerated rates of degradation, while greater than 5.0 parts of photosensitizer tends to be wasteful and may even interfere with processability.

The invention is further illustrated by the following examples wherein parts are parts by weight unless otherwise indicated.

EXAMPLE I

To a 12 oz. crown-cap bottle, there was charged in sequence 100 parts of water, 0.025 part of sodium dodecylbenzenesulfonate, 1.0 part of Progesterone, 2.0 parts of tricalcium phosphate, 100 parts of polystyrene beads having a particle size of predominantly through 16 and on 35 mesh, U.S. Standard Sieve, and 8.5 parts of n-pentane. The bottle was closed and heated with end-over-end agitation for 10 hours at 90°C. The suspension was cooled to room temperature and acidified to a pH of 1.4 with HCl. The beads were separated from the aqueous phase by centrifuge, washed with water, and air dried at room temperature. A control experiment was run using the above procedure omitting the progesterone.

The beads from the above impregnation process were pre-expanded to a density of about 1.5 pounds per cubic foot (p.c.f.). The pre-expanded beads were then molded into strips of foam 1 × 5 × ½ inches of approximately 1.5 p.c.f. density.

These strips were masked with aluminum foil, wrapped around the long axis, such that about half the strip was protected. The strips were then placed flat beneath a 20-watt fluorescent sunlamp such that the exposed half of the strips were about 3 inches from the light. After one 96-hour lamp exposure, the strip containing the progesterone showed gross yellowing and embrittlement compared to the control strip.

Embrittlement was measured by lightly scraping the rounded end of a spatula across the foam surface.

Similar preparation and treatment of samples containing 0.5, 2.0 and 2.5 parts of progesterone per 100 parts of polystyrene would show that the degradation due to ultraviolet light was greater with greater amounts of the sensitizer.

EXAMPLE II

The procedure of Example I was repeated replacing the 1.0 part of progesterone with the sensitizers shown in Table I. Foamed strips were exposed under the 20-watt fluorescent sunlamp as in Example I with the result that, after one 96-hour exposure, the strips containing the sensitizers showed the degree of yellowing and embrittlement compared to the control strip shown in the Table.

Table I

| Sensitizer | Final Exposed Sample Color | Surface Embrittlement |
|---|---|---|
| None | White | None |
| Androst-4-ene-3,17-dione | Light Yellow | Gross |
| Testosterone | Pale Yellow | Very Slight |
| Androst-4-ene-3,11,17-trione | Light Yellow | Slight |
| Androsta-1,4-diene-3,17-dione | Yellow | Gross |
| Androsta-1,4-diene-3,11,17-trione | Yellow | Slight |
| Pregna-4,16-diene-3,20-dione | Light Yellow | Trace |
| Pregn-4-ene-3,11,20-trione | Light Yellow | Trace |
| Progesterone | Yellow | Slight |

All of these induced some embrittlement. The degree of embrittlement was gross> slight> very slight> trace> none. Alternate 96-hour lamp exposure and air-jet ablations would have emphasized the embrittlement effects.

What is claimed is:

1. A process for making expandable styrene polymer particles containing a photosensitizer comprising suspending styrene polymer particles with the aid of a suspending system in water containing a blowing agent and a photosensitizer, heating the suspension at a temperature from about 80° to 150°C. to impregnate the polymer particles, and separating the impregnated particles from the water; said photosensitizer being present in an amount of 0.5–5.0 parts by weight per 100 parts by weight of said polymer particles and being selected from the group consisting of those steroids having a 3-keto-group combined with an ethylenic unsaturation conjugated therewith.

2. The process of claim 1 wherein said steroid is selected from the group consisting of gon-1-en-3-one, gon-4-en-3-one, gona-1,4-dien-3-one, estr-1-en-3-one, estr-4-en-3-one, estra-1,4-dien-3-one, androst-1-en-3-one, androst-4-en-3-one, androsta-1,4-dien-3-one, pregn-1-en-3-one, pregn-4-en-3-one, pregna-1,4-dien-3-one, chol-1-en-3-one, chol-4-en-3-one, chola-1,4-dien-3-one, cholest-1-en-3-one, cholest-4-en-3-one, cholesta-1,4-dien-3-one, and their derivatives.

3. The process of claim 1 wherein said steroid is androst-4-ene-3,17-dione.

4. The process of claim 1 wherein said steroid is androsta-1,4-diene-3,17-dione.

5. The process of claim 1 wherein said steroid is progesterone.

6. The process of claim 1 wherein said steroid is testosterone.

7. The process of claim 1 wherein said steroid is pregna-4,16-diene-3,20-dione.

8. The process of claim 1 wherein said steroid is androsta-1,4-diene-3,11,17-trione.

9. The process of claim 1 wherein said steroid is pregn-4-ene-3,11,20-trione.

10. A foamed styrene polymer composition comprising a styrene polymer containing 0.5 to 5.0 parts by weight of a photosensitizer per 100 parts by weight of styrene polymer; said photosensitizer being selected from the group consisting of those steroids having a 3-keto-group combined with an ethylenic unsaturation conjugated therewith.

11. The composition of claim 10 wherein said steroid is selected from the group consisting of gon-1-en-3-one, gon-4-en-3-one, gona-1,4-dien-3-one, estr-1-en-3-one, estr-4-en-3-one, estra-1,4-dien-3-one, androst-1-en-3-one, androst-4-en-3-one, androsta-1,4-dien-3-one, pregn-1-en-3-one, pregn-4-en-3-one, pregna-1,4-dien-3-one, chol-1-en-3-one, chol-4-en-3-one, chola-1,4-dien-3-one, cholest-1-en-3-one, cholest-4-en-3-one, cholesta-1,4-dien-3-one, and their derivatives.

12. The composition of claim 10 wherein said steroid is androst-4-ene-3,17-dione.

13. The composition of claim 10 wherein said steroid is androsta-1,4-diene-3,17-dione.

14. The composition of claim 10 wherein said steroid is progesterone.

15. The composition of claim 10 wherein said steroid is testosterone.

16. The composition of claim 10 wherein said steroid is pregna-4,16-diene-3,20-dione.

17. The composition of claim 10 wherein said steroid is androsta-1,4-diene-3,11,17-trione.

18. The composition of claim 10 wherein said steroid is pregn-4-ene-3,11,20-trione.

* * * * *